(12) United States Patent
Ferrer et al.

(10) Patent No.: US 10,815,316 B2
(45) Date of Patent: Oct. 27, 2020

(54) MACROPOROUS BEADS

(71) Applicant: University of Vienna, Vienna (AT)

(72) Inventors: Juan Ferrer, Vancouver (CA); Angelika Menner, Vienna (AT); Alexander Bismarck, Vienna (AT)

(73) Assignee: University of Vienna, Vienna (AT)

( * ) Notice: Subject to any disclaimer, the term of this patent is extended or adjusted under 35 U.S.C. 154(b) by 0 days.

(21) Appl. No.: 16/344,679

(22) PCT Filed: Oct. 31, 2017

(86) PCT No.: PCT/EP2017/077857
§ 371 (c)(1),
(2) Date: Apr. 24, 2019

(87) PCT Pub. No.: WO2018/078179
PCT Pub. Date: May 3, 2018

(65) Prior Publication Data
US 2020/0055965 A1    Feb. 20, 2020

(30) Foreign Application Priority Data
Oct. 31, 2016    (EP) .................................... 16196601

(51) Int. Cl.
*C08F 2/22* (2006.01)
*C08F 2/48* (2006.01)
*C08L 33/04* (2006.01)

(52) U.S. Cl.
CPC .................. *C08F 2/22* (2013.01); *C08F 2/48* (2013.01); *C08L 33/04* (2013.01)

(58) Field of Classification Search
CPC .............. C08F 2/22; C08F 2/48; C08L 33/04
See application file for complete search history.

(56) References Cited

U.S. PATENT DOCUMENTS

| | | | |
|---|---|---|---|
| 4,618,468 A | 10/1986 | Rigler et al. | |
| 6,166,097 A * | 12/2000 | Yonemura | B01D 17/0217 521/64 |
| 7,727,599 B2 * | 6/2010 | Doehler | C08L 83/06 427/515 |
| 2007/0209552 A1 * | 9/2007 | Gottschalk-Gaudig | A61K 8/066 106/287.1 |
| 2009/0176897 A1 | 7/2009 | Finch et al. | |
| 2011/0130534 A1 * | 6/2011 | Besnard | C08F 226/06 526/200 |

FOREIGN PATENT DOCUMENTS

| | | |
|---|---|---|
| EP | 2055724 | 5/2009 |
| WO | 2004011537 | 2/2004 |
| WO | 2015070074 | 5/2015 |

OTHER PUBLICATIONS

PCT/EP2017/077857; PCT International Search Report and Written Opinion of the International Searching Authority dated Jan. 23, 2018.

Gokmen et al.; Porous polymer particles—A comprehensive guide to synthesis, characterization, functionalization, and applications. Progress in Polymer Science 2012, 37, (3), 365-405.

* cited by examiner

*Primary Examiner* — Irina S Zemel
(74) *Attorney, Agent, or Firm* — Renner, Otto, Boisselle & Sklar, LLP

(57) ABSTRACT

A continuous process for manufacturing macroporous beads, the process comprising: providing an aqueous carrier phase flowing through a pipe at a carrier phase flow velocity; providing an emulsion of a UV-polymerisable or thermally polymerisable continuous phase in an aqueous dispersed phase; injecting the emulsion into the carrier phase at an injection speed to create polymerisable droplets flowing in the carrier phase; forming macroporous beads by irradiating the droplets with UV light, or by heating the droplets to a temperature sufficient to decompose a thermal initiator in the continuous phase, to polymerise the droplets; and removing the macroporous beads from the carrier phase; wherein the ratio of carrier phase flow velocity/injection speed is at least 1.

18 Claims, 11 Drawing Sheets

MACROPOROUS BEADS

This application is a national phase of International Application No. PCT/EP2017/077857 filed Oct. 31, 2017 and published in the English language, which claims priority to EP Patent Application No. 16196601.5 filed Oct. 31, 2016, all of which are hereby incorporated herein by reference in their entireties.

BACKGROUND a. Field of the Invention

The present invention relates to a continuous process for manufacturing macroporous beads. Macroporous beads have pores greater than about 50 nm and are of use in applications such as packing materials, or in the encapsulation and delivery of active ingredients.

b. Related Art

Macroporous polymer beads of a desired size can be created in batches on a small scale in laboratory conditions by microfluidic polymerisation. In microfluidic polymerisation, two syringe pumps are connected to a plastic piece of tubing or to a glass capillary. One syringe injects a carrier phase and the other one injects a UV polymerisable emulsion that forms droplets into the carrier phase. Those droplets are exposed to UV light to initiate the polymerisation. Once solidified the beads are collected at the end of the line and dried. Particles produced using microfluidics typically have sizes between 10-1000 µm with a CV (coefficient of variance) between 1% and 5% depending on the setup used. The low CV, a distinctive characteristic of microfluidic systems, is obtained due to the fact that the flow rate and volumes used (usually in the range of microliters to picoliters) are so low that the entire system is working in a laminar regime (non-turbulent flow) usually with Reynolds numbers below 100 and often below 1. The major drawbacks of this kind of synthesis method are the low production rate, and clogging of the tubing after a few minutes.

However to date the techniques have proved difficult to upscale; the equipment requires regular cleaning and maintenance leading to low yields. If larger quantities are required then alternative techniques such as suspension polymerisation are employed. However, these techniques are non-continuous processes and there is little control over the size of the beads. The desired sizes have to be extracted for instance through filtering with different sized grid meshes, leading to high levels of waste.

There are several alternative methods to produce porous particles; suspension, dispersion, precipitation, membrane/microchannel emulsification are the main techniques. More information about production of polymer particles can be consulted in a comprehensive guide elaborated by Du Prez et al (Gokmen, M T; DuPrez, F E, Porous polymer particles—A comprehensive guide to synthesis, characterization, functionalization, and applications. *Progress in Polymer Science* 2012, 37, (3), 365-405). All mentioned methods are based on the immiscibility of two or more liquids to create droplets and after polymerisation, polymer particles.

In sedimentation polymerisation, emulsion droplets are released and polymerised through an immiscible sedimentation medium. The polydispersity is low (CV around 2%) because the droplets are spatially isolated from one another during sedimentation. The main disadvantages of sedimentation polymerisation are the low production rates and the fact that it is not a continuous process.

Macroporous polymers can be synthesised using high internal phase emulsions (HIPEs) through emulsion templating. HIPEs are usually highly viscous, paste-like emulsions in which an internal phase, usually defined as constituting more than 74% of the emulsion volume, is dispersed within a continuous external phase. PolyHIPEs are produced by the polymerisation of the external phase. After removal of the internal templating phase a porous structure is revealed. Macroporous polyHIPE beads can be produced using the same principles. A polymerisable emulsion is dispersed into an appropriate third phase forming droplets due to the interfacial tension between the continuous phase of the emulsion and the third phase. Those droplets can be polymerised to form macroporous beads.

Suspension polymerisation is widely applied in industry because of the low cost and upscaling possibilities. In this process particles with wide size dispersity are obtained and after production the particles are sieved to specific size ranges.

Polydispersity and low efficiency are the main drawbacks of suspension polymerisation.

U.S. Pat. No. 4,618,468 discloses a batch process for making beads using suspension polymerisation. The process uses thermal polymerisation, with temperatures of 80-125° C. and polymerisation times from 30 minutes to six hours. The resulting beads have a size distribution from 2.5 mm or more to 0.41 mm or less.

EP 2 055 724 describes a batch process for making porous resin beads containing an aromatic vinyl compound-hydroxystyrene-di(meth)acrylate copolymer by thermal polymerisation of a solution of (meth)acrylates and solvents, at temperatures of 60-90° C. Polymerisation times are in the range of hours (0.5 to 48). Bead diameters range from 80 µm to 116 µm and pore sizes range from 29 to 68 nm.

It is desirable to provide a process that permits continuous production of large quantities of macroporous beads, with a control of output bead size which is closer to those produced in a laboratory batch process, the size distribution being narrow but not necessarily monodisperse.

SUMMARY OF THE INVENTION

According to the invention there is provided a continuous process for manufacturing macroporous beads.

We have found that the process can be run with a CV between 17% and 28%, with bead sizes between 400 µm and 1000 µm and production rates of 50 cm$^3$/h and scalable. The production rate is far greater than can be achieved using microfluidics, which by definition work in the laminar flow in a micro- and nanoscale.

According to an aspect, a continuous process for manufacturing macroporous beads includes: providing an aqueous carrier phase flowing through a pipe at a carrier phase flow velocity; providing an emulsion of a UV-polymerisable or thermally polymerisable continuous phase in an aqueous dispersed phase; injecting the emulsion into the carrier phase at an injection speed to create polymerisable droplets flowing in the carrier phase; forming macroporous beads by irradiating the droplets with UV light, or by heating the droplets to a temperature sufficient to decompose a thermal initiator in the continuous phase, to polymerise the droplets; and removing the macroporous beads from the carrier phase; wherein the ratio of carrier phase flow velocity/injection speed is at least 1.

Embodiments may include the following additional features.

The ratio of carrier phase flow velocity/injection speed may be in the range 1-5.

The carrier phase may contain an initiator for initiating or promoting polymerisation of the continuous phase in the emulsion.

The carrier phase may contain a material to be encapsulated within the macroporous beads.

The aqueous dispersed phase of the emulsion may have the same composition as the aqueous carrier phase.

The continuous phase may make up 30-50% of the emulsion by volume.

The emulsion may further include colloidal particles.

The colloidal particles may be hydrophobic.

The colloidal particles may be selected from the group consisting of: hydrophobised silica, titania, alumina, clay or carbon nanotubes, or mixtures thereof.

The colloidal particles may have sizes in the range 20-100 nm.

The carrier phase may contain a non-ionic polymer.

The non-ionic polymer may be polyvinylalcohol.

The carrier phase may further include a non-ionic surfactant.

The non-ionic surfactant may be an alkylphenol alkoxylate.

The alkylphenol may be octylphenol ethoxylate.

The process may further include recycling at least some of the carrier phase from which the macroporous beads have been removed, to an inlet of the pipe.

The process of removing the macroporous beads from the carrier phase may be carried out by filtration.

The carrier phase flow velocity and the injection speed may be in the range 1-6 cm/s.

The carrier phase may flow through the pipe with laminar flow. The carrier phase may flow through the pipe with laminar flow having a Reynolds number in the range 160-800.

BRIEF DESCRIPTION OF THE DRAWINGS

The invention will now be further described, by way of example only, with reference to the following drawings, in which.

DETAILED DESCRIPTION

Figure 1:
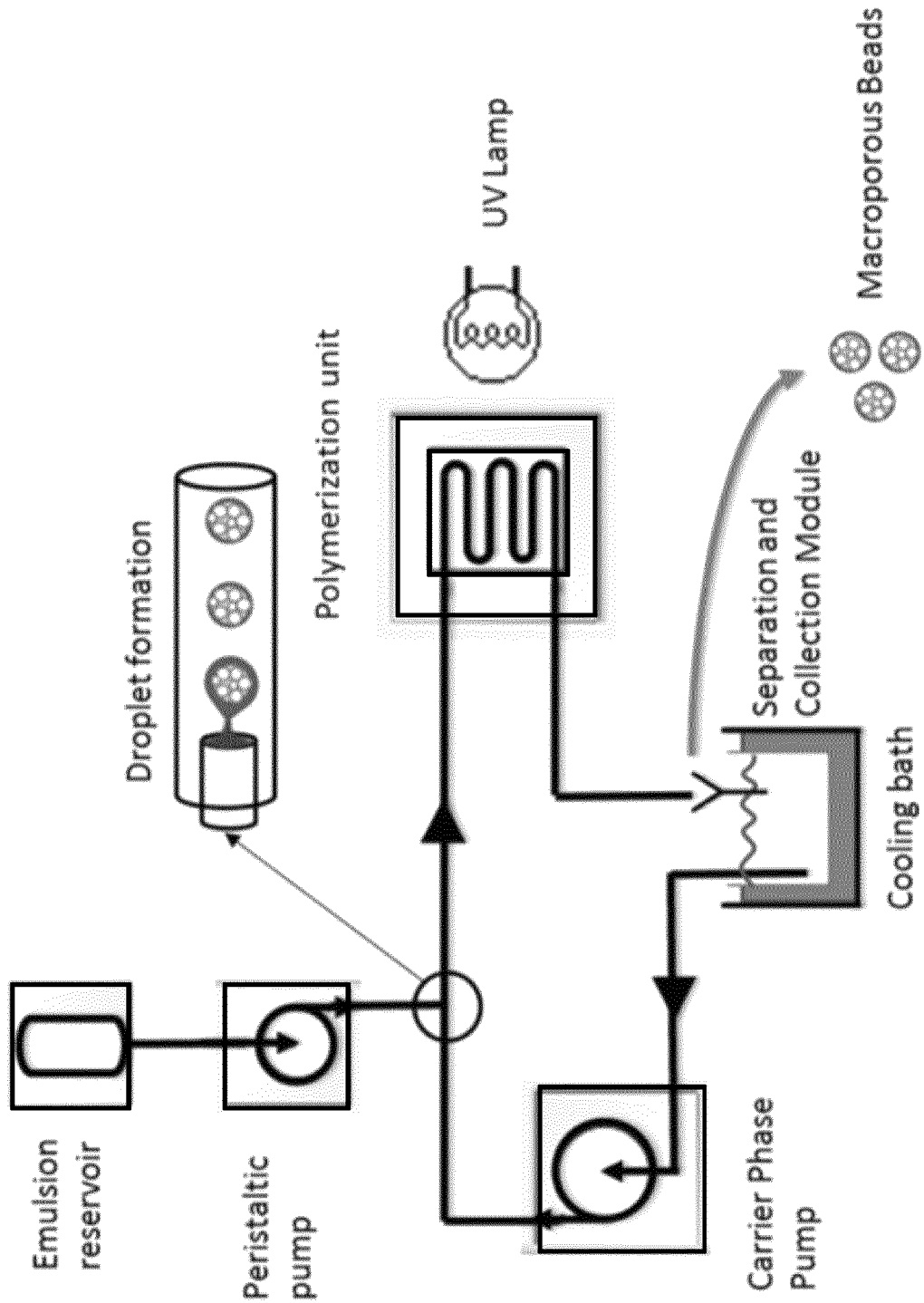
FIG. 1 is a schematic of a continuous process for manufacturing macroporous beads in accordance with an embodiment of the invention.

In the apparatus of FIG. 1, a carrier phase pump draws an aqueous carrier phase from a reservoir (in this example, a cooling bath) and pumps it through a pipe to a polymerisation unit. In this example the pipe has an internal diameter of 12 mm. An emulsion of a UV-polymerisable continuous phase in an aqueous dispersed phase is provided in an emulsion reservoir. The emulsion is pumped (in this example by a peristaltic pump) through an injector into the carrier phase within the pipe. The injection produces droplets of the emulsion in a recirculating carrier phase. The emulsion droplets are transported by the carrier phase to the polymerisation unit where the droplets are irradiated with UV light within a quartz glass structure to form macroporous beads. The beads which exit the polymerisation unit are separated from the carrier phase (in this example, by a polyester mesh) and removed. The carrier phase, which has been warmed by the UV-irradiation, is cooled in the cooling bath before being recycled by the carrier phase pump.

Figure 12:
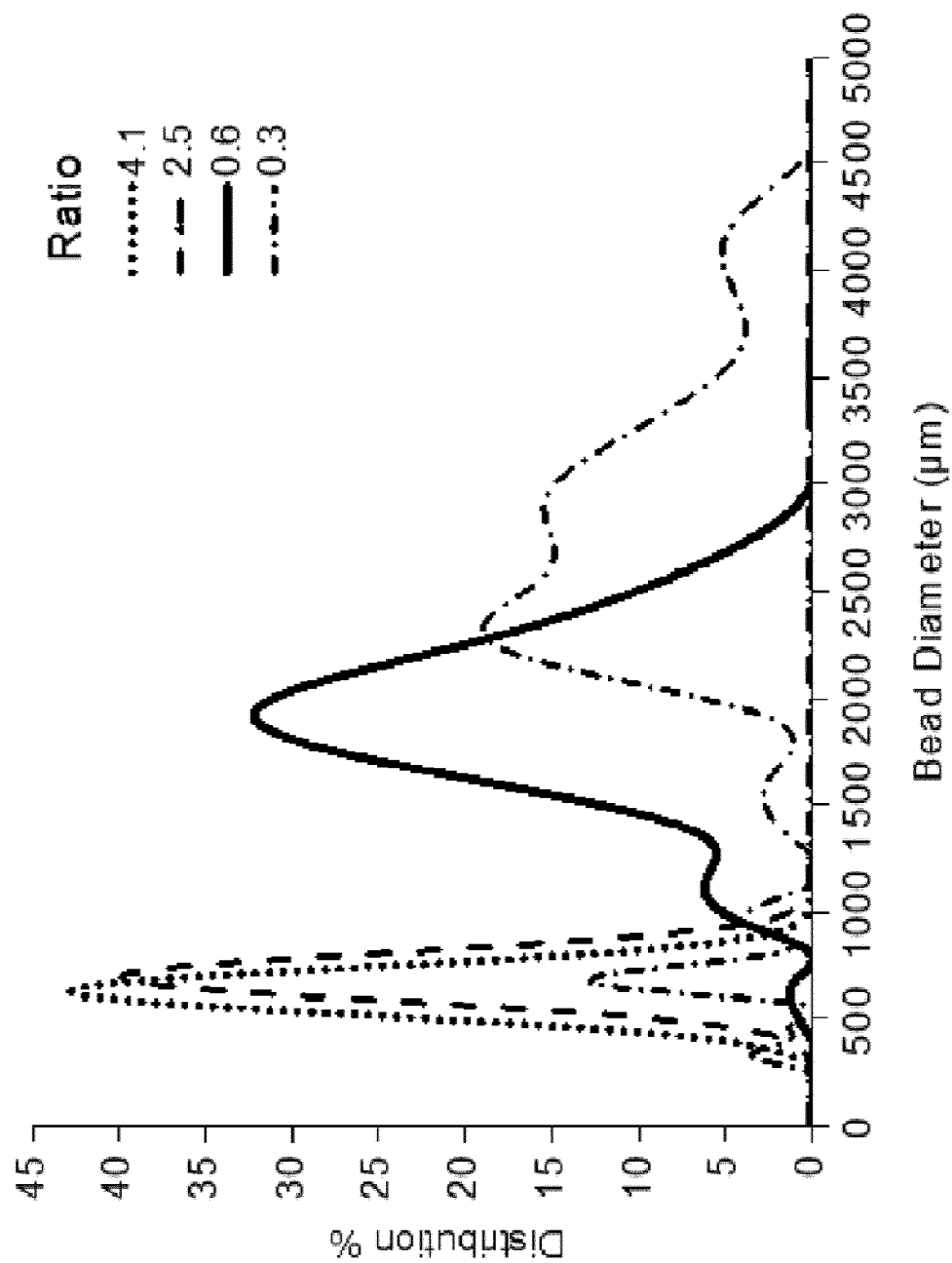
FIGS. 12 and 13 are graphs of bead diameter size distributions for varying process conditions.
Figure 13:
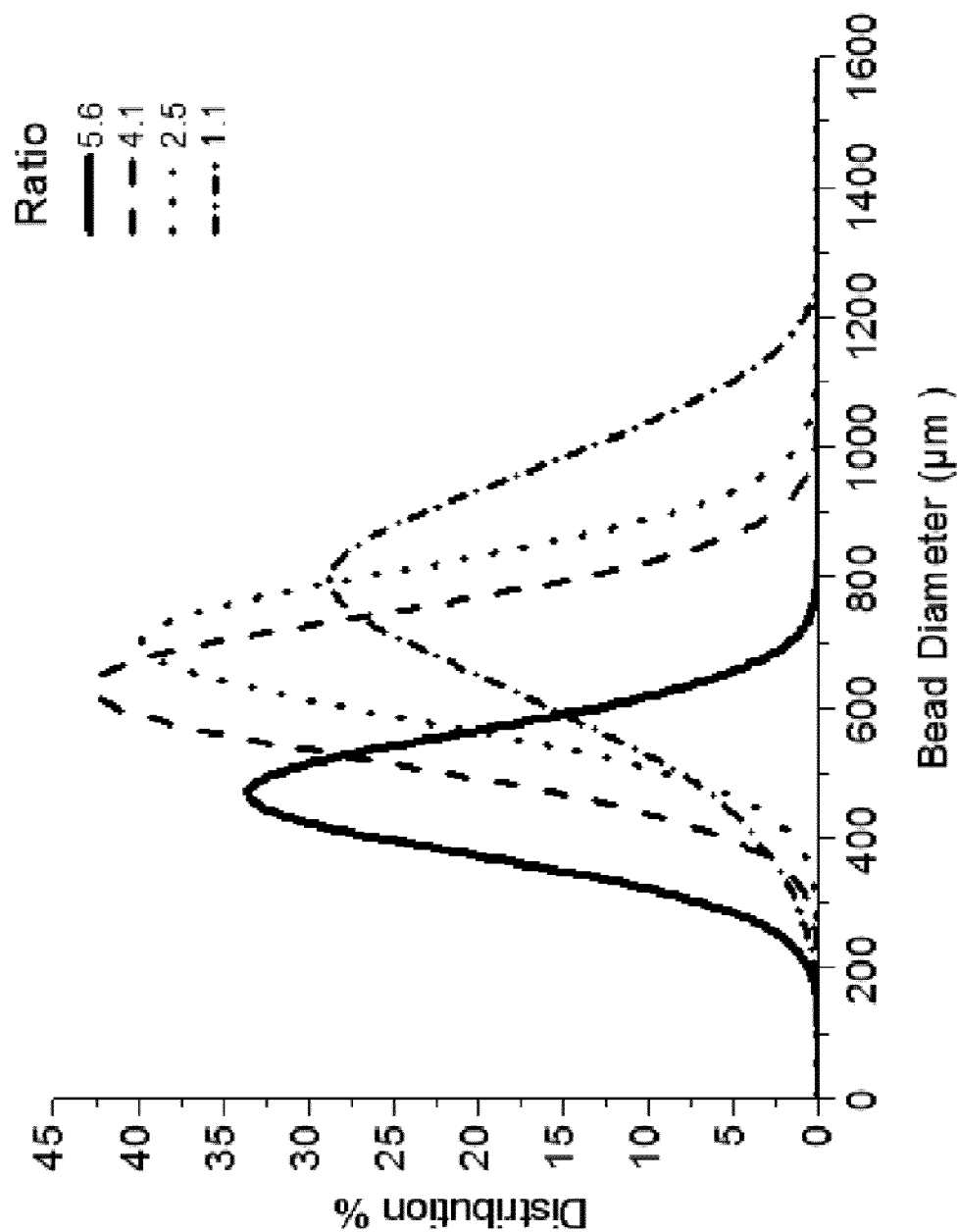

The carrier phase flows through the pipe at a carrier phase speed. The emulsion is injected at an injection speed. We have found that to achieve smaller bead sizes and an acceptable bead size CV it is necessary for the ratio of carrier phase speed/injection speed to be at least 1, preferably in the range 1-5. Without wishing to be bound by theory, we believe that this may be because, below a speed ratio of 1 a "jetting effect" occurs, in which a thread of emulsion is formed at the tip of the injector needle, and satellite droplets form, having increased polydispersity (CV>0.4). With a speed ratio of 1 or more the "dripping regime" prevails, in which droplets are formed at the tip of the injector needle and macroporous beads can be obtained having average size less than 1 mm and CV 0.17-0.28. Operating within a ratio between one and five is particularly preferred. Bead size distributions for various ratios of carrier phase speed to injection speed are shown in FIGS. 12 and 13. Injection speed was varied between 1.1-11.2 cm/s and carrier phase speed was varied between 1.37-6.7 cm/s. Ratios above 1 have significantly narrower size distributions.

Emulsion Formation—1

In these examples, emulsions were formed by adding dropwise the dispersed phase to the organic UV-polymerisable continuous phase while stirring at 500 rpm. After addition is complete, stirring at 500 rpm is continued for five minutes.

Continuous Phase

Methyl methacrylate (MMA) 60% vol (Sigma Aldrich)

Ethylene glycol dimethacrylate (EGDMA) 40% vol (Sigma Aldrich)

Surfactant: Pluronic L-81 15% vol with respect to monomer volume (Poly(ethylene glycol)-block-poly(propylene glycol)-block-poly(ethylene glycol), average Mn ~2,800 10% wt, Sigma Aldrich)

Photoinitiator: Darocur 1173 1.5% vol with respect to monomer volume (2-hydroxy-2-methyl-1-phenyl-propan-1-one, Ciba Specialty Chemicals)

Dispersed Phase

Aqueous solution: $CaCl_2.2H_2O$ 1.3% wt.

Emulsion

Continuous phase: 30% vol

Dispersed phase: 70% vol.

Carrier Phase

PVA+Triton X-405 (Dow: octylphenol ethoxylate, x=35 avg) 1.15%

The emulsion was injected into the aqueous carrier phase to create droplets that were exposed to UV light (Mercury ~365 nm) to polymerise within a quartz glass structure (length: 970 cm). Results are given in Table 1. We found that changing the injection conditions makes it possible to control bead size until a certain point. When the flow velocity of the carrier phase is too high, we found that part of the injected emulsion is destabilised and destroyed, reducing the yield from the process.

TABLE 1

| Surfactant (%) | Internal phase vol (%) | Ratio of speed | Average bead size [μm] | CV | Yield | Injection [cm/s] | Injection [cm³/h] | Carrier phase [cm/s] | Carrier phase [cm³/h] | Average pore size [μm] | Average pore throat size [μm] |
|---|---|---|---|---|---|---|---|---|---|---|---|
| 15 | 70 | 5.66 | 444 ± 98 | 22% | 58% | 1.1 | 5.4 | 6.23 | 25200 | 12.73 ± 7.12 | 3.46 ± 1.32 |
| 15 | 70 | 4.10 | 566 ± 99 | 17% | 86% | 1.1 | 5.4 | 4.51 | 18360 | 12.89 ± 7.68 | 3.73 ± 1.27 |
| 15 | 70 | 2.49 | 674 ± 162 | 24% | 77% | 1.1 | 5.4 | 2.74 | 11160 | 13.25 ± 7.75 | 4.25 ± 1.38 |
| 15 | 70 | 1.10 | 717 ± 202 | 28% | 82% | 3.7 | 18 | 4.07 | 16560 | 13.73 ± 8.88 | 3.64 ± 1.10 |
| 15 | 70 | 0.60 | 1819 ± 463 | 25% | 66% | 11.2 | 54 | 6.7 | 27360 | 14.71 ± 8.99 | 3.13 ± 0.94 |
| 15 | 70 | 0.31 | 2176 ± 1089 | 50% | 83% | 11.2 | 54 | 3.52 | 14400 | 16.81 ± 9.87 | 3.51 ± 1.34 |

Figure 2:
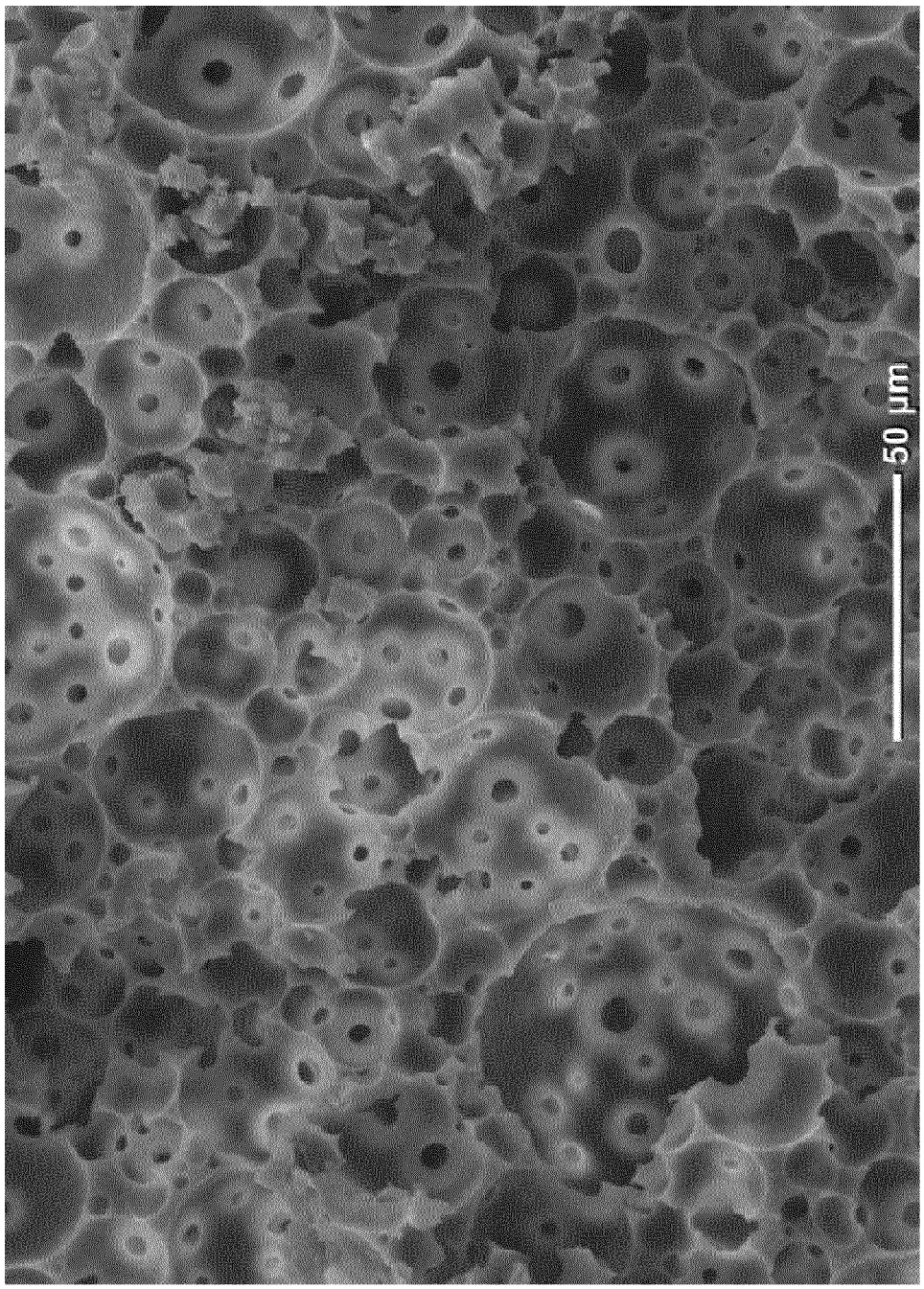
FIGS. 2-11 show surfaces and the internal morphology of macroporous beads made by processes in accordance with embodiments of the present invention.

A photomicrograph of the internal structure of macroporous beads from a surfactant-stabilised emulsion is shown in FIG. 2. Interconnecting pores are clearly visible.

Figure 3:
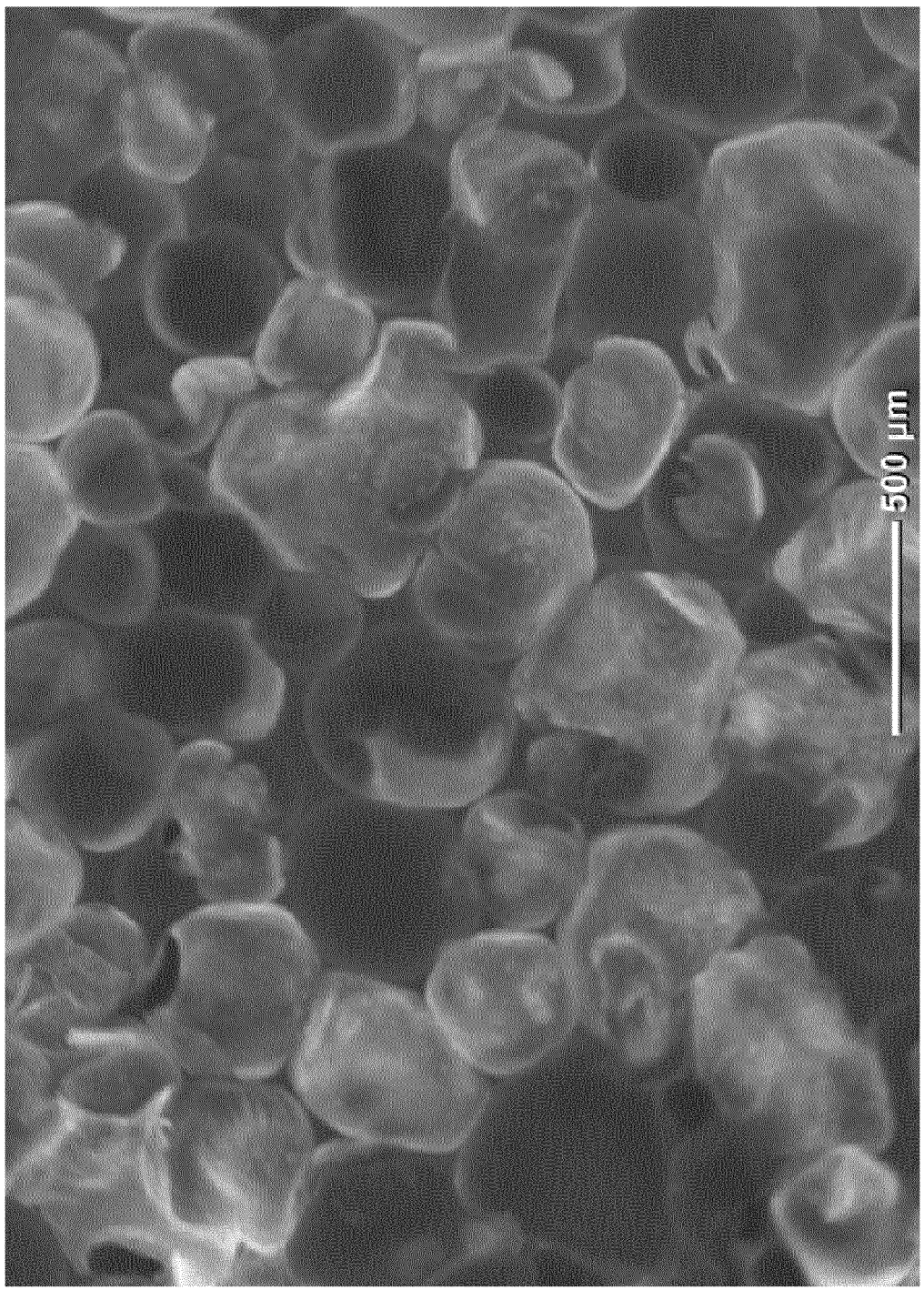

We found that colloidal particles could be used in place of a surfactant to stabilise the emulsion. The colloidal particles are preferably of size 20-100 nm, and are preferably hydrophobised hydrophilic oxide particles, such as silica, titania, alumina or clay or hydrophobic carbon nanotubes. Colloidal particles stabilise the emulsion droplets by adsorbing at the interface between the continuous phase and the dispersed phase and form a film which acts a physical barrier that prevents droplet coalescence. The particles attach at the droplets interface, and as a result of this thermodynamically driven process, reduce the free higher energy interface area, which leads to an energy decrease of the entire system. The adsorption hereby depends on two parameters: the contact angle and interfacial tension. Particles with contact angles that are larger than 90° will be better dispersible in oil phases and preferentially create w/o emulsions. On the other hand particles with contact angles of less than 90° will be better dispersible in the aqueous phase and form o/w emulsions. FIG. 3 shows the internal structure of beads from an emulsion stabilised with silica particles. Here, the pores are closed.

Other emulsions were tested, in which the surfactant concentration was varied between 15% and 30%, and the internal phase volume was varied between 50% and 80%. Results are given in Table 2.

Encapsulation of Active Ingredients

By closing surface pores, it is possible to encapsulate greater quantities of reagents or active ingredients. As an example, HCl was encapsulated.

Emulsion Formation—2

In this example, the emulsion was formed by adding dropwise the dispersed phase to the organic UV-polymerisable continuous phase while stirring at 500 rpm. After addition is complete, the stirring speed was increased to 1000 rpm and continued for five minutes.

Continuous Phase
  Methyl methacrylate (MMA) 60% vol
  (Sigma Aldrich)
  Ethylene glycol dimethacrylate (EGDMA) 40% vol
  (Sigma Aldrich)
  Surfactant: Pluronic L-81 12.5% vol with respect to monomer volume
  (10% wt, Sigma Aldrich)
  Photoinitiator: Darocur 1173 1.5% vol with respect to monomer volume (2-hydroxy-2-methyl-1-phenyl-propan-1-one, Ciba Specialty Chemicals)

Dispersed Phase
  Aqueous solution: $CaCl_2 \cdot 2H_2O$ 1.3% wt. 66.7% vol
  HCl 0.48M 33.3% vol.

Emulsion
  Continuous phase: 40% vol
  Dispersed phase: 60% vol.

TABLE 2

| Surfactant concentration (%) | Internal phase volume (%) | Ratio of speed | Average bead size [μm] | CV | Yield | Injection [cm/s] | Injection [cm³/h] | Carrier phase [cm/s] | Carrier phase [cm³/h] | Average pore size [μm] | Average pore throat size [μm] |
|---|---|---|---|---|---|---|---|---|---|---|---|
| 15 | 50 | 4.5 | 404 ± 79 | 20% | 60% | 1.1 | 5.4 | 4.97 | 20160 | 13.60 ± 8.28 | 3.74 ± 1.83 |
| 30 | 50 | 3.3 | 564 ± 122 | 22% | 90% | 1.1 | 5.4 | 3.65 | 14760 | 2.83 ± 1.44 | 0.38 ± 0.09 |
| 15 | 80 | 5.0 | 554 ± 103 | 19% | 59% | 1.1 | 5.4 | 5.49 | 22320 | 12.66 ± 7.85 | 3.39 ± 1.41 |
| 30 | 80 | 0.28 | 306 ± 12* | 3.9% | 32% | 11.2 | 54 | 3.15 | 12960 | 3.21 ± 1.15 | 0.94 ± 0.28 |

*For the process using 30% surfactant concentration, 80% internal phase volume and a speed ratio of 0.28, no beads were formed, but rather "small sausages" or rods, of lengths varying from about 0.5 to 5 mm.

Changing the formulation allowed control of pore size and interconnecting pore throat size of the beads. Higher amounts of surfactant tend to form emulsions with smaller droplets that will become very open porous after polymerisation and drying. Whereas emulsions stabilised by particles tend to contain larger droplets and will from after polymerisation and drying macroporous beads with a closed cell structure.

Figure 4:
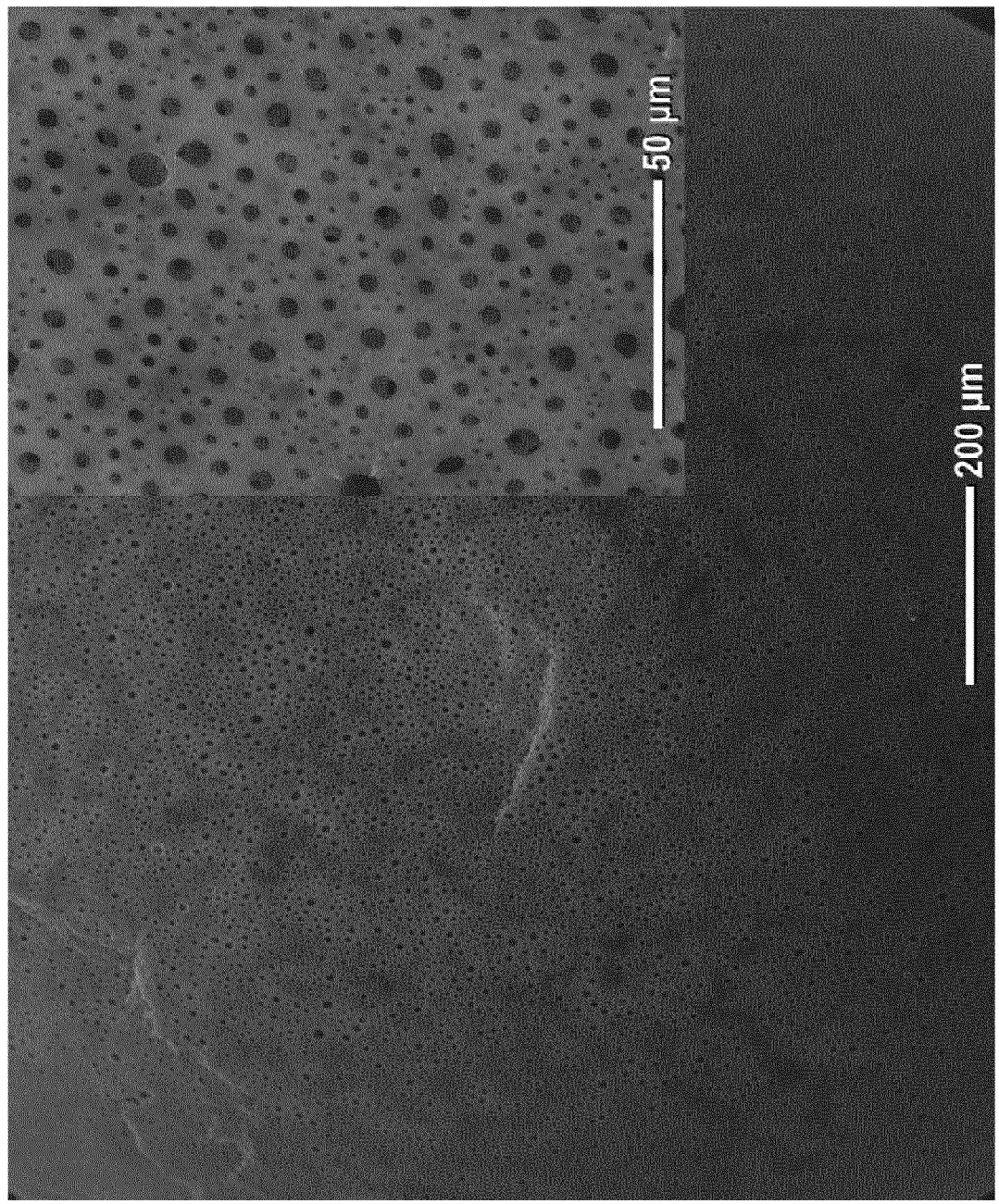
Figure 5:
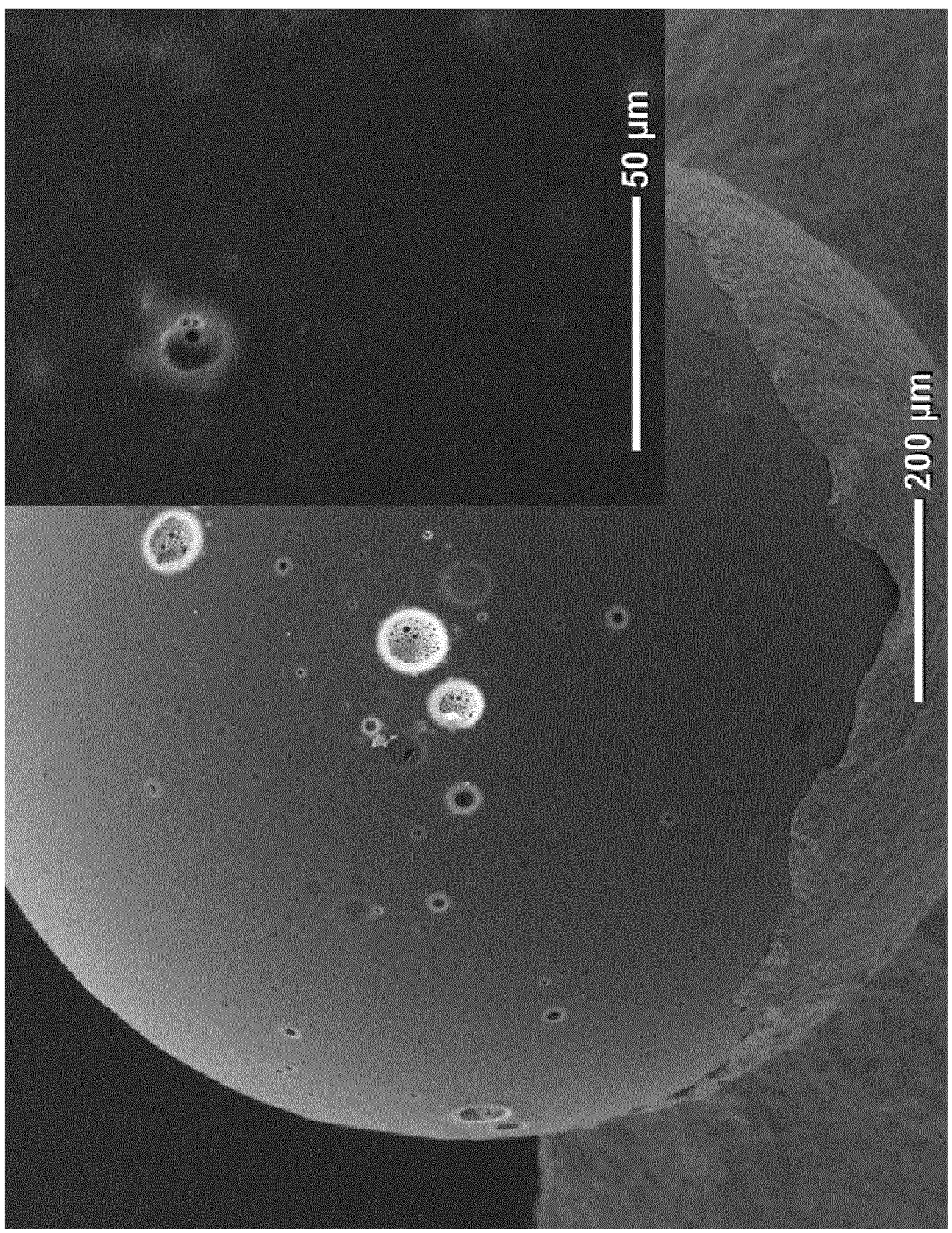

Carrier Phase
  PVA+Triton X-405 (Dow: octylphenol polyethoxylate, x=35 avg) 3% wt. or the same solution as was used for the dispersed phase.
  FIG. 4 shows surface pores for the case where the carrier phase was the same as the dispersed phase. Pore sizes were 2.34±1.71 μm and the beads contained 28±18 mmol HCl/g of bead, measured after 24 hours of rest in a sealed beaker.
  FIG. 5 shows surface pores where the carrier phase was PVA/Triton X-405. Injecting into this carrier phase produced a decrease in the size and the number of pores in the bead surface. The pore size was 1.37±0.78 μm and the beads contained 92±0.52 mmol HCl/g of bead, measured after 24 hours of rest in a sealed beaker.

Figure 6:
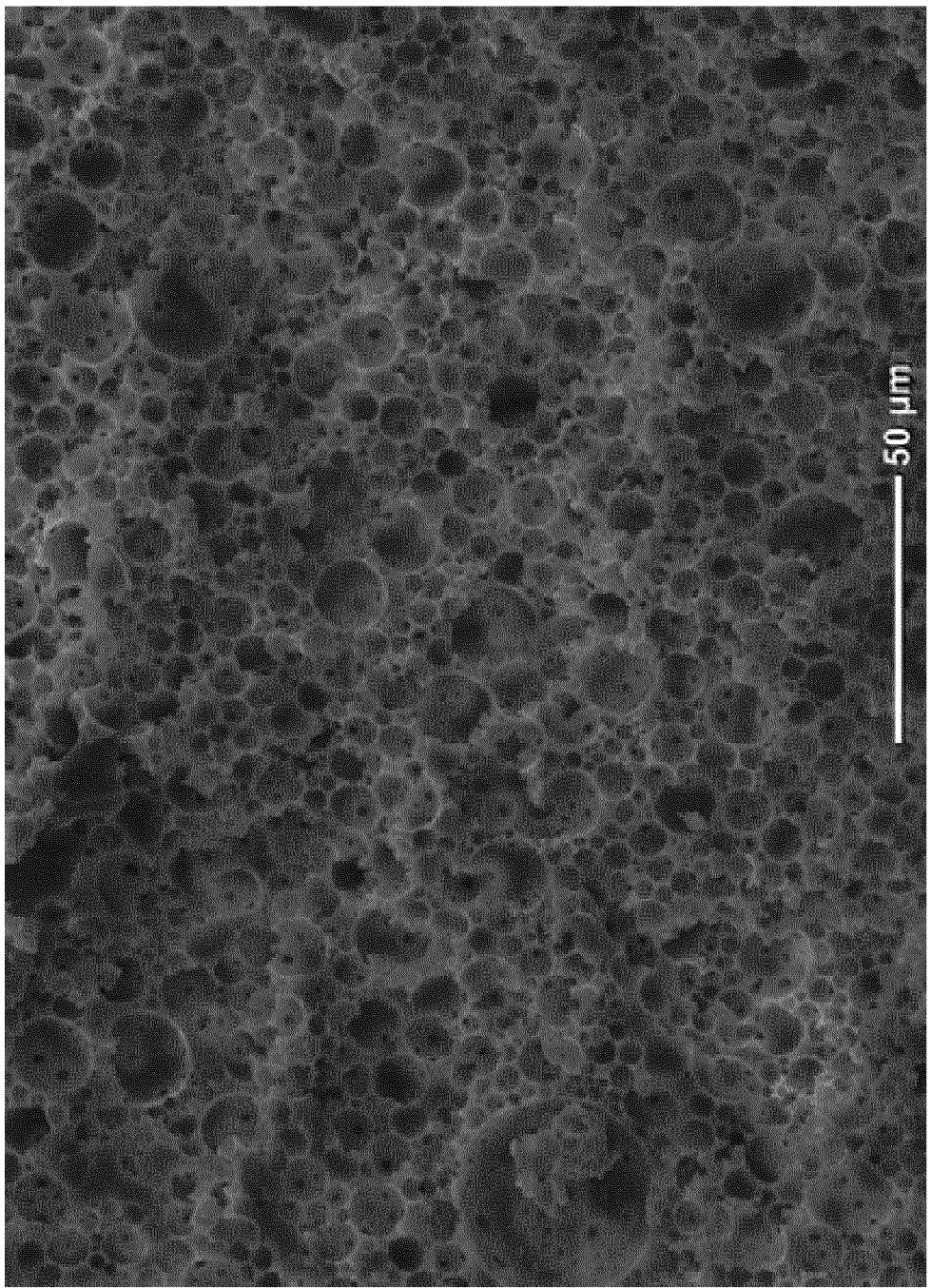

Internal pores for the bead of FIG. 4 is shown in FIG. 6. Pore size was 4.94±2.89 µm. Pore throat size was 0.96±0.35 µm.

Figure 7:
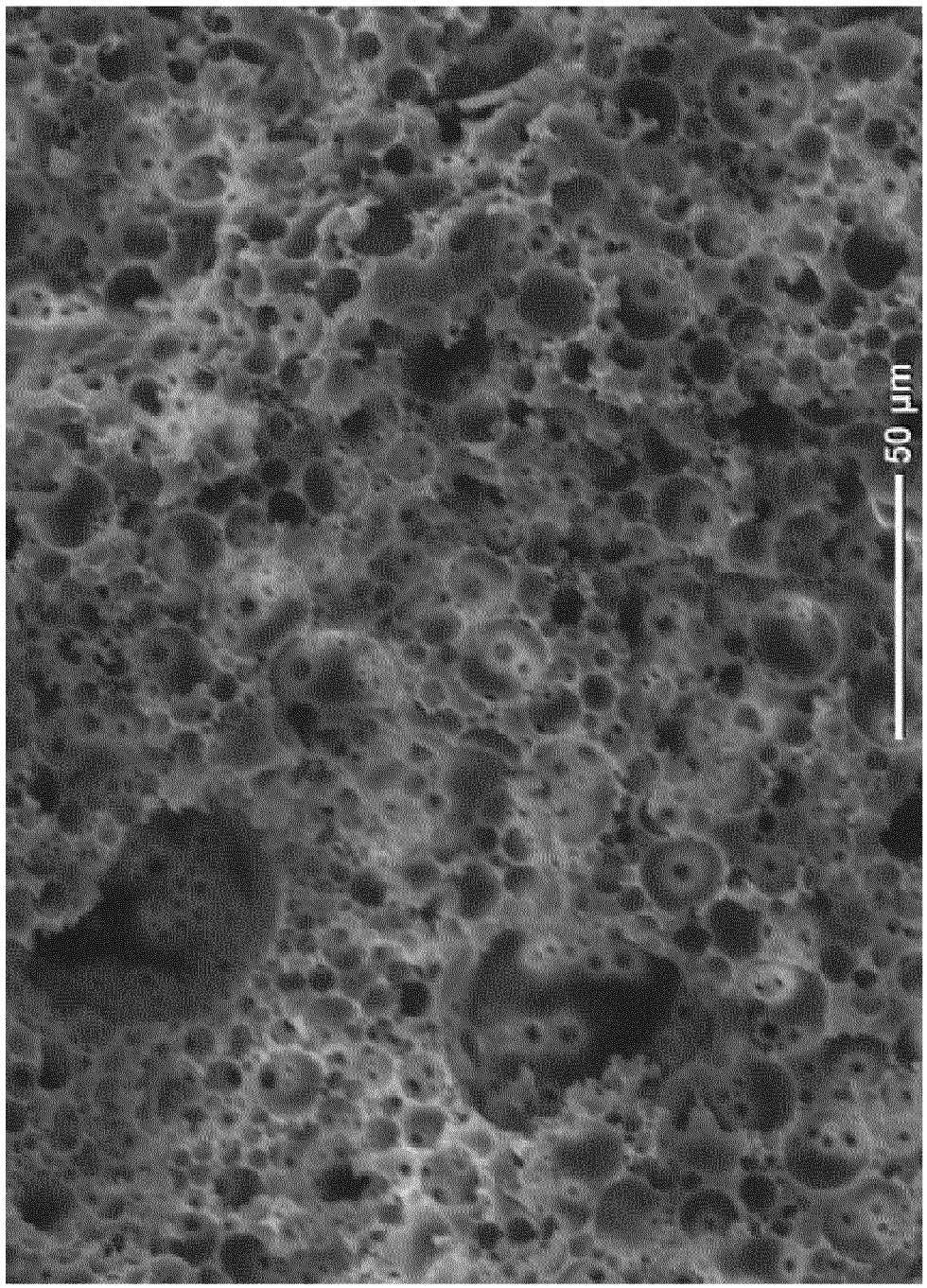

Internal pores for the bead of FIG. 5 is shown in FIG. 7. Pore size was 7.46±4.40 µm. Pore throat size was 1.75±0.62 µm.

Modifying Surface—Initiator in Continuous Phase v Initiator in Carrier Phase

In these examples, the emulsion was formed by adding dropwise the dispersed phase to the organic UV-polymerisable continuous phase while stirring at 500 rpm. After addition was complete, the stirring speed was increased to 1000 rpm and continued for five minutes.

(1) Initiator in Continuous Phase

Continuous Phase
  Methyl methacrylate (MMA) 60% vol
  (Sigma Aldrich)
  Ethylene glycol dimethacrylate (EGDMA) 40% vol
  (Sigma Aldrich)
  Surfactant: Pluronic L-81 15% vol with respect to monomer volume
  (Sigma Aldrich)
  Photoinitiator: Darocur 1173 1.5% vol with respect to monomer volume
  (2-hydroxy-2-methyl-1-phenyl-propan-1-one, Ciba Specialty Chemicals)

Dispersed Phase
  Aqueous solution: $CaCl_2 \cdot 2H_2O$ 1.3% wt.

Emulsion
  Continuous phase: 30% vol
  Dispersed phase: 70% vol.

Carrier Phase
  Aqueous solution: $CaCl_2 \cdot 2H_2O$ 1.3% wt.

(2) Initiator in Carrier Phase

Continuous Phase
  Methyl methacrylate (MMA) 60% vol
  (Sigma Aldrich)
  Ethylene glycol dimethacrylate (EGDMA) 40% vol
  (Sigma Aldrich)
  Surfactant: Pluronic L-81 15% vol with respect to monomer volume
  (Sigma Aldrich)

Dispersed Phase
  Aqueous solution: $CaCl_2 \cdot 2H_2O$ 1.3% wt.

Emulsion
  Continuous phase: 30% vol
  Dispersed phase: 70% vol.

Carrier Phase
  Aqueous solution $CaCl_2 \cdot 2H_2O$ 0.5% wt.+Darocur 1173 5.9% vol or 0.06 ml/ml (2-hydroxy-2-methyl-1-phenyl-propan-1-one, Ciba Specialty Chemicals)

Figure 8:
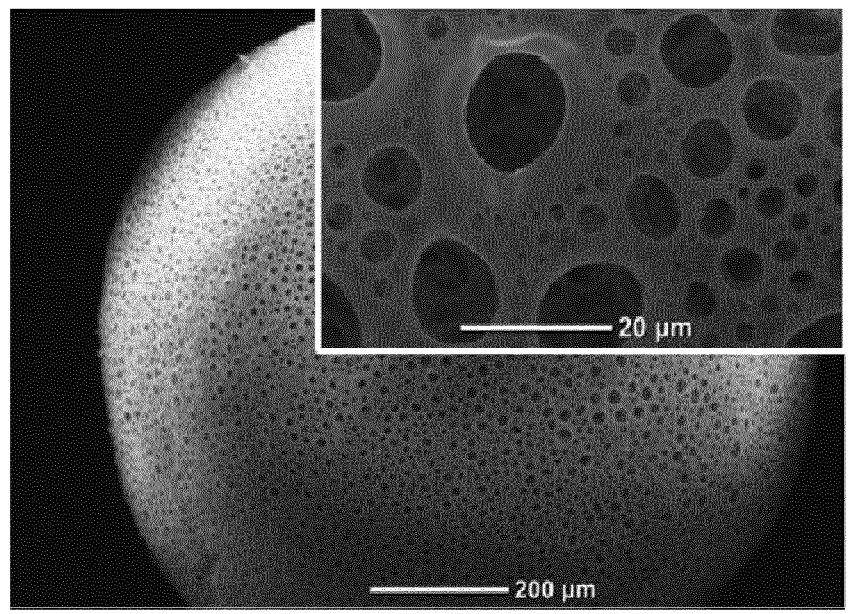
Figure 9:
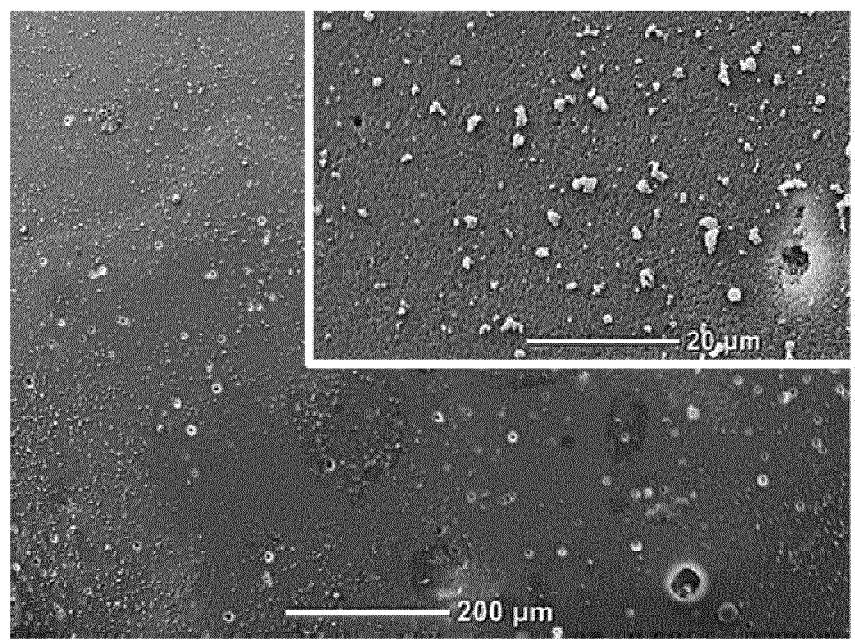
Figure 10:
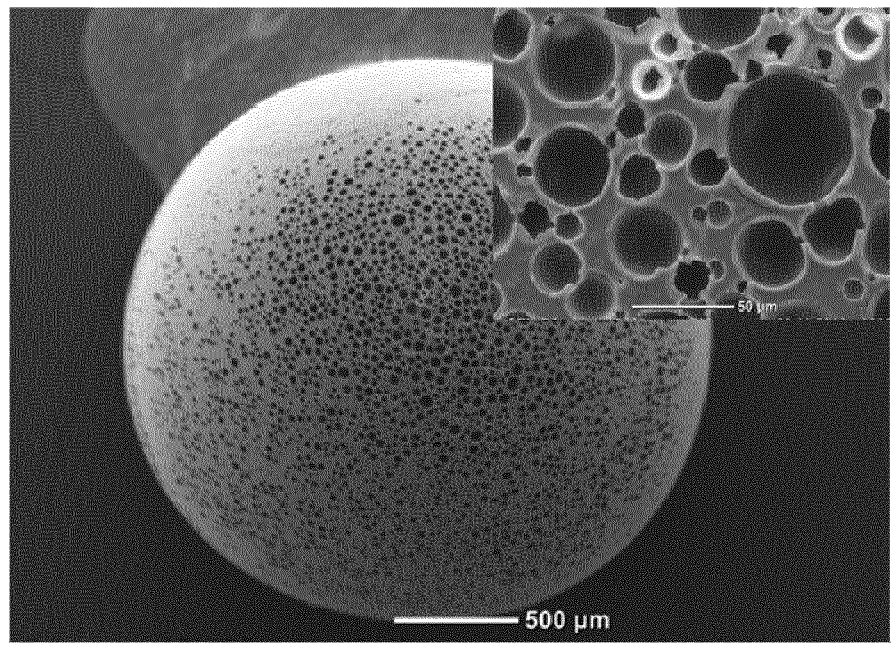

Photomicrographs of beads from (1) are shown in FIG. 8, and from (2) in FIG. 10. Including the polymerisation initiator in the recirculating carrier phase results in substantially closed surface pores.

Particle-Stabilized Emulsions

Continuous Phase
  Methyl methacrylate (MMA) 60% vol
  (Sigma Aldrich)
  Ethylene glycol dimethacrylate (EGDMA) 40% vol
  (Sigma Aldrich)
  Hydrophobic silica particles HDK®H30 4% wt respect to monomer weight
  (Wacker Chemie AG)
  Photoinitiator: Darocur 1173 1.5% vol with respect to monomer volume
  (2-hydroxy-2-methyl-1-phenyl-propan-1-one, Ciba Specialty Chemicals)

The continuous phase was stirred using an homogenizer for 10 minutes at 15,000 rpm.

Dispersed Phase
  Aqueous solution: $CaCl_2 \cdot 2H_2O$ 1.3% wt.

Emulsion
  Continuous phase: 45% vol
  Dispersed phase: 55% vol.

The emulsion was formed by adding dropwise the dispersed phase while stirring at 500 rpm. After addition was complete, stirring was continued for 15 minutes at 1000 rpm. The resultant emulsion was injected into the carrier phase.

Carrier Phase
  $CaCl_2 \cdot 2H_2O$ 1.3% wt.

Results are given in Table 3, together with results for emulsions formed in a similar manner but with 70% internal volume. Yields were about 60-80%.

TABLE 3

| Internal phase vol (%) | Ratio of speed | Average bead size [µm] | CV | Injection [cm/s] | Injection [cm³/h] | Carrier phase [cm/s] | Carrier phase [cm³/h] | Average pore size [µm] |
|---|---|---|---|---|---|---|---|---|
| 55 | 4.22 | 941 ± 210 | 22% | 1.3 | 1.2 | 5.49 | 22320 | 16.30 ± 8.75 |
| 55 | 2.81 | 1530 ± 373 | 24% | 1.3 | 1.2 | 3.65 | 14760 | 17.35 ± 8.92 |
| 70 | 0.74 | 2260 ± 690 | 31% | 3.7 | 18 | 2.74 | 11160 | 16.61 ± 9.64 |
| 70 | 0.33 | 2720 ± 890 | 33% | 11.2 | 54 | 3.65 | 14760 | 18.79 ± 9.62 |

The emulsions were more viscous than the surfactant-stabilized emulsions that we tested, and bigger beads can be produced. We found that changing injection conditions permits control of bead size up to a point. Injection speeds higher than the carrier phase speed makes it difficult to control the bead size and the CV increases.

Figure 11:
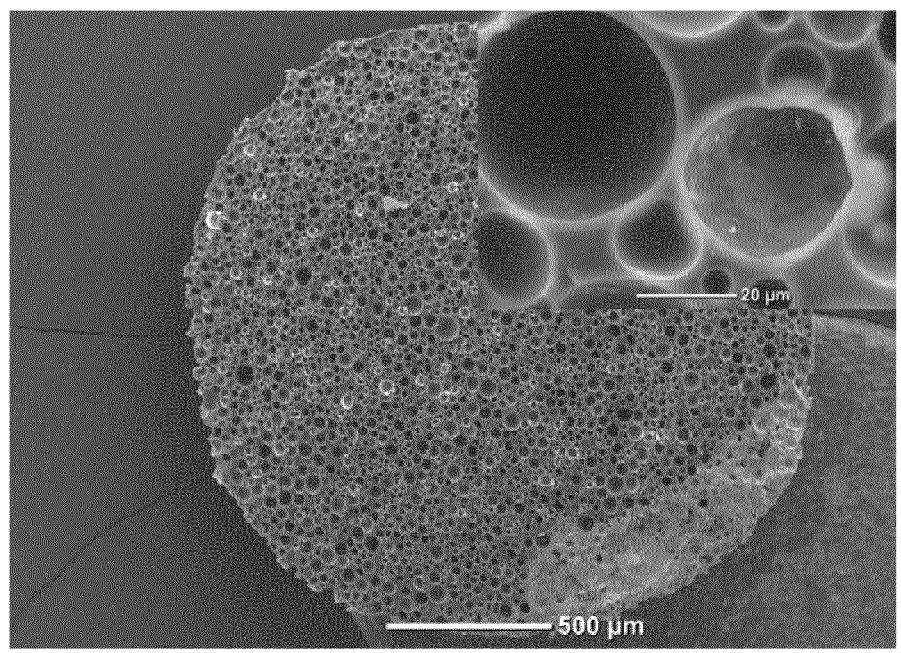

FIG. 10 is a photomicrograph of a bead produced using a silica-stabilized emulsion. The surface is covered with closed pores. The internal morphology can be seen in FIG. 11, which shows the interior of the bead and the closed pores therein.

The term 'pipe' is used herein to refer to a vessel through which fluids can be made to flow. It will be understood that various shapes and sizes of vessel may be used in the present invention, although it is preferred that the pipe have constant internal diameter. It is particularly preferred that the pipe has an internal diameter sufficient to avoid clogging if a droplet adheres to an internal surface. The internal diameter is preferably at least 2 mm, particularly preferably at least 5 mm, notably at least 10 mm. Desirably, the system operates using laminar flow, preferably having a Reynolds number (Re) in the range 160-800.

The inventive process allows production of macroporous beads, having pores either closed or open at the surface and without clogging. The process is scalable and permits control of bead size. The UV light completely polymerises the monomer so that no post-treatment is needed. With optimisation, the process produces yields around 80-90%.

The invention has been illustrated with reference to UV-polymerisation. However, it will be understood that the continuous phase could alternatively be polymerised by an increase in temperature, to decompose a thermal initiator in the continuous phase. Thermal initiated polymerisation is particularly useful for monomers which cannot be photo polymerised, such as styrene. Suitable thermal initiators will be well known to those skilled in the art of polymer chemistry.

The invention claimed is:

1. A continuous process for manufacturing macroporous beads, the process comprising:
   providing an aqueous carrier phase flowing through a pipe at a carrier phase flow velocity;
   providing an emulsion of a UV-polymerisable or thermally polymerisable continuous phase in an aqueous dispersed phase;
   injecting the emulsion into the carrier phase at an injection speed to create polymerisable droplets flowing in the carrier phase;
   forming macroporous beads by irradiating the droplets with UV light, or by heating the droplets to a temperature sufficient to decompose a thermal initiator in the continuous phase, to polymerise the droplets; and
   removing the macroporous beads from the carrier phase; wherein
   the ratio of carrier phase flow velocity/injection speed is at least 1, and the carrier phase flows through the pipe with laminar flow having a Reynolds number in the range 160-800.

2. The process according to claim 1, wherein the ratio of carrier phase flow velocity/injection speed is in the range 1-5.

3. The process according to claim 1, wherein the carrier phase contains an initiator for initiating or promoting polymerisation of the continuous phase in the emulsion.

4. The process according to claim 1, wherein the carrier phase contains a material to be encapsulated within the macroporous beads.

5. The process according to claim 1, wherein the aqueous dispersed phase of the emulsion has the same composition as the aqueous carrier phase.

6. The process according to claim 1, wherein the continuous phase makes up 30-50% of the emulsion by volume.

7. The process according to claim 1, wherein the emulsion further comprises colloidal particles.

8. The process according to claim 7, wherein the colloidal particles are selected from the group consisting of: hydrophobised silica, titania, alumina, clay or carbon nanotubes, or mixtures thereof.

9. The process according to claim 7, wherein the colloidal particles have sizes in the range 20-100 nm.

10. The process according to claim 1, wherein the carrier phase contains a non-ionic polymer.

11. The process according to claim 10, wherein the carrier phase further comprises a non-ionic surfactant.

12. The process according to claim 1, further comprising recycling at least some of the carrier phase from which the macroporous beads have been removed, to an inlet of the pipe.

13. The process according to claim 1, wherein the process of removing the macroporous beads from the carrier phase is carried out by filtration.

14. The process according to claim 1, wherein the carrier phase flow velocity and the injection speed are in the range 1-6 cm/s.

15. The process according to claim 7, wherein the colloidal particles are hydrophobic.

16. The process according to claim 10, wherein the non-ionic polymer is polyvinylalcohol.

17. The process according to claim 11, wherein the non-ionic surfactant is an alkylphenol alkoxylate.

18. The process according to claim 17, wherein the alkylphenol is octylphenol ethoxylate.

* * * * *